United States Patent
Bentzien et al.

(10) Patent No.: US 9,626,390 B2
(45) Date of Patent: Apr. 18, 2017

(54) SHADOW SYSTEM START DURING UPGRADE OF AN ORIGINAL SYSTEM

(75) Inventors: Levke Bentzien, Heidelberg (DE); Wieland Hoprich, Mannheim (DE)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 12/979,175

(22) Filed: Dec. 27, 2010

(65) Prior Publication Data

US 2012/0166493 A1 Jun. 28, 2012

(51) Int. Cl.
*G06F 17/30* (2006.01)

(52) U.S. Cl.
CPC ...... *G06F 17/303* (2013.01); *G06F 17/30575* (2013.01)

(58) Field of Classification Search
CPC .................. G06F 17/30575; G06F 17/303
USPC ........................................................ 707/674
See application file for complete search history.

(56) References Cited

U.S. PATENT DOCUMENTS

| | | | |
|---|---|---|---|
| 6,105,025 A | 8/2000 | Jacobs et al. | |
| 6,151,608 A | 11/2000 | Abrams | |
| 6,385,770 B1 | 5/2002 | Sinander | |
| 6,711,560 B2 | 3/2004 | Levy et al. | |
| 6,721,725 B2 | 4/2004 | Levy et al. | |
| 6,999,977 B1 | 2/2006 | Norcott et al. | |
| 7,028,022 B1 | 4/2006 | Lightstone et al. | |
| 7,085,831 B2 | 8/2006 | Larkin | |
| 7,111,023 B2 | 9/2006 | Norcott | |
| 7,236,991 B2 | 6/2007 | Becker et al. | |
| 7,461,097 B2 | 12/2008 | Stahl et al. | |
| 7,523,142 B2 | 4/2009 | Driesen et al. | |
| 7,620,665 B1 | 11/2009 | George et al. | |
| 7,647,354 B2 | 1/2010 | Norcott | |
| 7,657,576 B1 | 2/2010 | Norcott | |
| 7,694,292 B2 | 4/2010 | Mueller et al. | |
| 7,917,475 B2 | 3/2011 | D'Souza et al. | |
| 8,060,713 B1 * | 11/2011 | Natanzon | 711/162 |
| 8,230,416 B2 | 7/2012 | Ivanov | |
| 8,527,471 B2 | 9/2013 | Hoprich et al. | |
| 8,924,350 B2 | 12/2014 | Hoprich et al. | |

(Continued)

OTHER PUBLICATIONS

Hudson, "Slashing Downtimes with Online Patching", Oracle, 2011, 54 pages.
"Triggers", Oracle8iConcepts, Release 2 (8.1.6), Part No. A76965-01, 2000, 23 pages.
"Oracle Data Guard 11g Data Protection Availablity for Oracle Database", An Oracle Technical White Paper, Oct. 2011, 22 pages.
"Oracle Data Guard Concepts and Administration 11g Release 1 (11.1)", Part No. B28294-03Oracle, 2008, 2 pages.

(Continued)

*Primary Examiner* — Albert Phillips, III
(74) *Attorney, Agent, or Firm* — Brake Hughes Bellermann LLP

(57) ABSTRACT

In one general aspect, a computer system can include instructions stored on a non-transitory computer-readable storage medium. The computer system can include a program database module configured to define, at a shadow system, a shadow program database including data and a structure collectively defining an upgrade to an original program database on an original system. The computer system can include a basis module configured to define at the shadow system a shadow basis database related to start functionality of the shadow system. The computer system can also include a downtime execution module configured to trigger the shadow system to change from a downstate to an upstate based on a combination of data included in the shadow basis database and the data of the shadow program database.

20 Claims, 7 Drawing Sheets

(56) References Cited

U.S. PATENT DOCUMENTS

| | | | |
|---|---|---|---|
| 8,984,514 B2 | 3/2015 | Hoprich | |
| 2002/0143731 A1 | 10/2002 | Levy et al. | |
| 2003/0130985 A1* | 7/2003 | Driesen et al. | 707/1 |
| 2003/0135478 A1 | 7/2003 | Marshall et al. | |
| 2004/0044997 A1 | 3/2004 | Talati et al. | |
| 2005/0165802 A1 | 7/2005 | Sethi et al. | |
| 2005/0251523 A1 | 11/2005 | Rajamani et al. | |
| 2007/0027934 A1 | 2/2007 | Roehrle et al. | |
| 2007/0180289 A1 | 8/2007 | Chai et al. | |
| 2007/0220065 A1 | 9/2007 | Coyle et al. | |
| 2007/0250542 A1 | 10/2007 | Chan et al. | |
| 2008/0098037 A1 | 4/2008 | Neil et al. | |
| 2008/0098046 A1 | 4/2008 | Alpern et al. | |
| 2008/0115134 A1* | 5/2008 | Elliott et al. | 718/101 |
| 2008/0256528 A1 | 10/2008 | Waitzmann et al. | |
| 2008/0294933 A1* | 11/2008 | Nishii et al. | 714/5 |
| 2009/0077563 A1 | 3/2009 | Thies et al. | |
| 2009/0094236 A1 | 4/2009 | Renkes et al. | |
| 2009/0113413 A1* | 4/2009 | Reinz | 717/173 |
| 2009/0172655 A1* | 7/2009 | Ivanov | 717/173 |
| 2009/0307277 A1 | 12/2009 | Grubov et al. | |
| 2010/0088281 A1 | 4/2010 | Driesen et al. | |
| 2010/0211548 A1 | 8/2010 | Ott et al. | |
| 2010/0218196 A1 | 8/2010 | Leung et al. | |
| 2010/0249980 A1* | 9/2010 | Ito | 700/121 |
| 2010/0318494 A1 | 12/2010 | Val et al. | |
| 2011/0252426 A1 | 10/2011 | Antani et al. | |
| 2012/0089625 A1 | 4/2012 | Bentzien et al. | |
| 2012/0137297 A1 | 5/2012 | Hoprich | |
| 2012/0166393 A1 | 6/2012 | Hoprich et al. | |
| 2012/0185439 A1 | 7/2012 | Chen et al. | |
| 2013/0159247 A1 | 6/2013 | Engelko et al. | |
| 2013/0290259 A1 | 10/2013 | Hoprich et al. | |

OTHER PUBLICATIONS

Ray, et al, "Seamless Application Failover with Oracle Data Guard", Oracle, Dec. 2010, 67 pages.

"Oracle Beehive Administrator's Guide Release 1 (1.5)", Part No. E14836-04, Oracle, 2009, 8 pages.

"Oracle In-Memory Database Cache User's Guide 11g Release 2 (11.2.2)", Part No. E21634-05, Oracle, 2012, 5 pages.

"Openworld 2011—Day 3 Summary", Oracle Apps Blog, Oct. 26, 2011, 3 pages.

"Using Triggers", Oracle9i Application Developer's Guide—Fundamentals Release 2 (9.2), Part No. A96590-01, 2002, 43 pages.

Response to Non-Final Office Action received for U.S. Appl. No. 12/902,475, mailed on Sep. 10, 2013, 10 pages.

Response to Non-Final Office Action for U.S. Appl. No. 12/902,475, filed Jun. 5, 2014, 14 pages.

Final Office Action Received for U.S. Appl. No. 12/902,475, mailed on Jun. 27, 2014, 20 pages.

Response to Non-Final Office Action for U.S. Appl. No. 13/325,896, filed Jul. 22, 2014, 12 pages.

Final Office Action received for U.S. Appl. No. 13/325,896, mailed on Sep. 24, 2014, 23 pages.

Response to Final Office Action for U.S. Appl. No. 13/929,221, filed Jun. 5, 2014, 11 pages.

Notice of Allowance received for U.S. Appl. No. 13/929,221, mailed on Aug. 29, 2014, 14 pages.

Notice of Allowance received for U.S. Appl. No. 12/956,902, mailed on Nov. 20, 2014, 5 pages.

Response to Final Office Action for U.S. Appl. No. 13/325,896, filed Dec. 18, 2014, 10 pages.

Notice of Allowance Received for U.S. Appl. No. 12/902,475, mailed on Mar. 31, 2015, 5 pages.

* cited by examiner

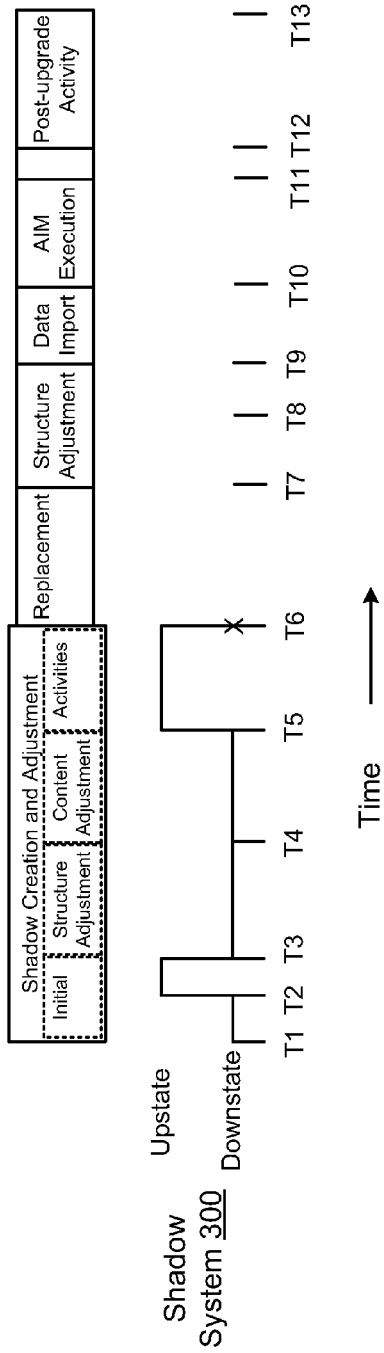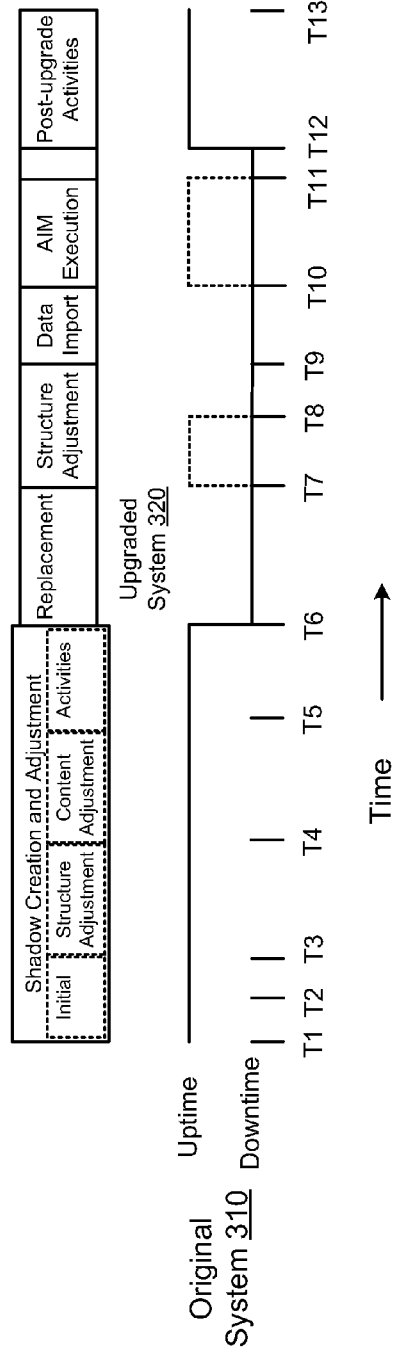
FIG. 3A
FIG. 3B

SHADOW SYSTEM START DURING UPGRADE OF AN ORIGINAL SYSTEM

TECHNICAL FIELD

This description relates to upgrading an original system to a target system.

BACKGROUND

Many known techniques for upgrading portions of an original system can cause an undesirable level of downtime within the original system. For example, using many of these known techniques, all (or nearly all) of the databases of an original system may be unavailable to users while the databases are being upgraded, and the upgrading of the databases may necessarily be implemented during a downtime of the entire original system. The duration and impact of the downtime of the original system and/or unavailability of the databases targeted for upgrade can be aggravated by computationally expensive and/or time-consuming commands used to modify the databases of the original system into an upgraded form. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include a program database module configured to define, at a shadow system, a shadow program database including data and a structure collectively defining an upgrade to an original program database on an original system. The computer system can include a basis module configured to define at the shadow system a shadow basis database related to start functionality of the shadow system. The computer system can also include a downtime execution module configured to trigger the shadow system to change from a downstate to an upstate based on a combination of data included in the shadow basis database and the data of the shadow program database.

In another general aspect, a non-transitory computer-readable storage medium can store code representing instructions that when executed are configured to cause a processor to perform a process. The code can include code to define, at a shadow system, a shadow program database including data and a structure collectively defining an upgrade to an original program database on an original system. The code can include code to define at the shadow system a shadow basis database related to start functionality of the shadow system. The code can also include code to trigger the shadow system to change from a downstate to an upstate based on a combination of data included in the shadow basis database and the data of the shadow program database.

In yet another general aspect, a method can include executing instructions recorded on a non-transitory computer-readable storage media using at least one processor. The method can include defining, at a shadow system, a shadow program database including data and a structure collectively defining an upgrade to an original program database on an original system. The method can include defining at the shadow system a shadow basis database related to start functionality of the shadow system. The method can also include triggering the shadow system to change from a downstate to an upstate based on a combination of data included in the shadow basis database and the data of the shadow program database.

The details of one or more implementations are set forth in the accompanying drawings and the description below. Other features will be apparent from the description and drawings, and from the claims.

BRIEF DESCRIPTION OF THE DRAWINGS

FIG. 3A illustrates upstates and downstates of a shadow system during an upgrade process.

FIG. 3B illustrates uptime and downtime of an original system during the upgrade process.

DETAILED DESCRIPTION

Figure 1:
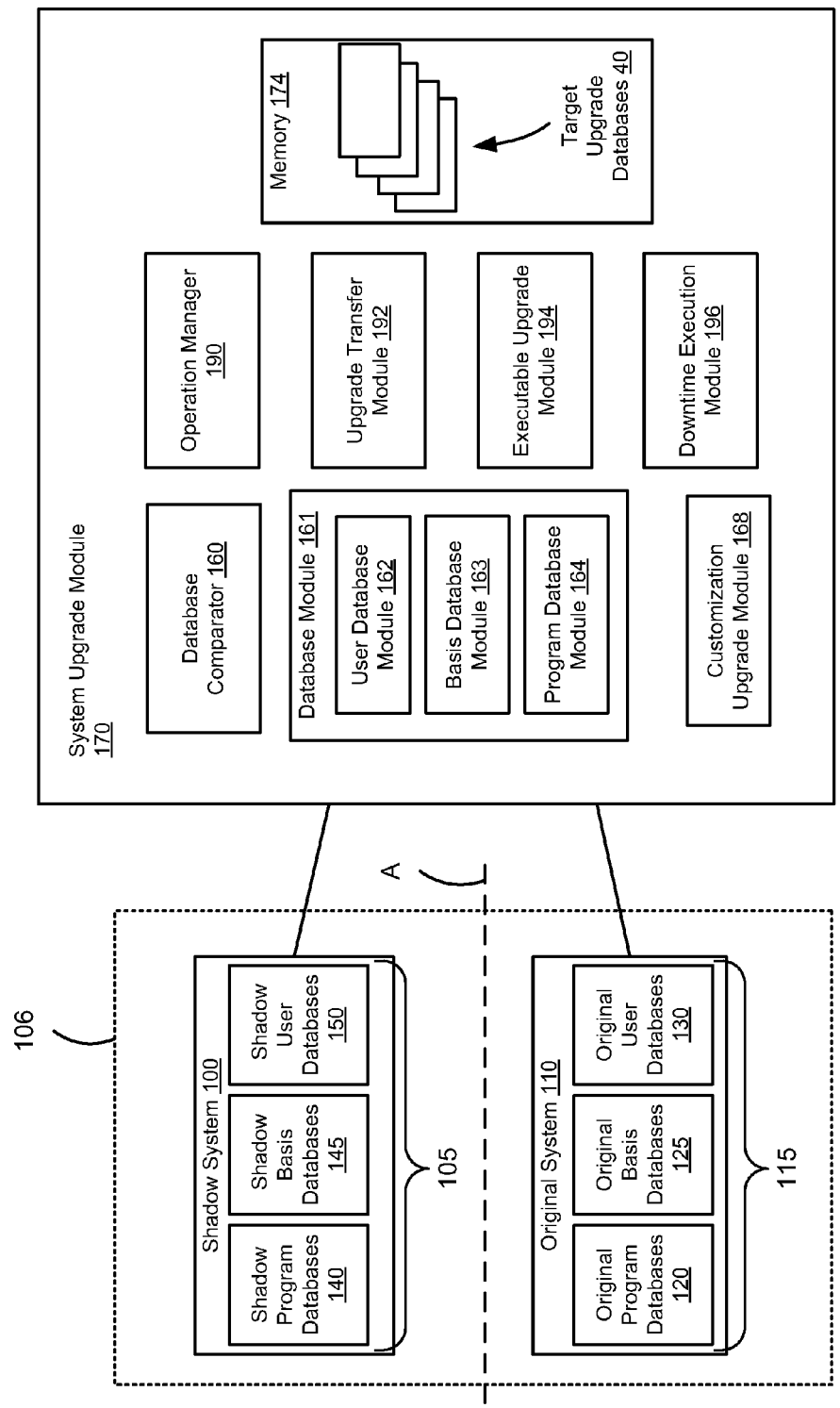
FIG. 1 is a block diagram that illustrates a system upgrade module configured to facilitate an upgrade of an original system using a shadow system.

FIG. 1 is a block diagram that illustrates a system upgrade module 170 configured to facilitate an upgrade of an original system 110 using a shadow system 100. The shadow system 100 is an environment within which certain operations of an upgrade process can be performed so that the original system 110 can operate in an active mode (e.g., remain in an upstate and/or uptime, continue in a normal operational environment) during the upgrade process. Specifically, the shadow system 100 can include one or more portions (e.g., databases, executable files) that correspond with portions (e.g., databases, executable files) of the original system 110. The portions of the shadow system 100 that correspond with the portions of the original system 110 can be referred to as corresponding portions. In some embodiments, the portions of the shadow system 100 that correspond with the portions of the original system 110 can be upgraded versions (e.g., modified versions) or exact copies of the portions of the original system 110. Portions of the upgrade process of the original system 110 can be performed on the corresponding portion(s) of the shadow system 100 while the original system 110 operates in an active mode. The corresponding portions of the shadow system 100, after being upgraded, can later be copied into (and replace portions of) the original system 110. In some embodiments, the original system 110 can be a stand-alone device and/or module, a server, a network, a data center, a software and/or hardware system, a virtual system, a system (e.g., an SAP system) defined based on Advanced Business Application Programming (ABAP), and/or so forth.

By performing certain portions of the upgrade process on the shadow system 100 rather than directly on the original system 110, the downtime of the original system 110 can be lower than if certain portions of the upgrade process are performed directly on the original system 110. In some embodiments, the downtime of the original system 110 during an upgrade process can be reduced (e.g., minimized) by performing certain portions of the upgrade process in the shadow system 100. In some embodiments, the shadow system 100 can be referred to as a shadow system because portions of the shadow system 100 can mirror (or shadow) certain portions of the original system 110.

Throughout this detailed description the terms up/upstate and down/downstate will be used to describe a functional state of a system (e.g., the shadow system 100, the original system 110), while the terms uptime and downtime will be used to describe the accessibility of the system by one or more users (while in a functional state). Thus, a system can only be operating during uptime (and be accessible by a typical user) when the system is also up (e.g., in an upstate), but a system can have downtime (and may not be accessible by a typical user) when the system is also up (e.g., in an upstate).

In some embodiments, the shadow system 100 can be defined specifically for use during the upgrade process. Specifically, the shadow system 100 can be a temporary system created for use during upgrade of the original system 110. After the original system 110 has been upgraded, the shadow system 100 and/or logs associated with the shadow system 100 can be dismantled and/or expunged.

As shown in FIG. 1, the shadow system 100 and the original system 110 are both configured to operate within a common set of hardware 106 (e.g., a common set of servers, a common network) and in a common environment (e.g., a common platform), but are operating within different partitions. The partition within which the shadow system 100 is operating is separate from (e.g., independent from) the partition within which the original system 110 is operating as depicted by line A. In some embodiments, the shadow system 100 and original system 110 may not be operating in different partitions. Although not shown, in some embodiments, portions of the shadow system 100 and/or portions of the original system 110 can be defined so that they operate within different sets of hardware and/or in different environments. In some embodiments, the shadow system 100 can be implemented as a virtual system (e.g., as a virtual machine).

As shown in FIG. 1, the original system 110 includes original program databases 120, original basis databases 125, and original user databases 130 that can collectively be referred to as original databases 115 of the original system 110. The original user databases 130 can include data defined by the owner of the original system 110. For example, the original user databases 130 can include user-specific data such as business data, financial data, and/or so forth. In some embodiments, the data stored within the original user databases 130 can be referred to as customer data. In some embodiments, the original user databases 130 can be referred to as customer databases. In some embodiments, the original user databases 130 can include, or can be, more than one database. If the original system 110 is an ABAP-based SAP system, the original program databases 120 can be ABAP repository tables.

The original basis databases 125 can be related to basic functionality of the original system 110 that enables restarting of the original system 110. In some embodiments, the original basis databases 125 can include data related to one or more services (e.g., data port services, display services, communication services, hardware interfacing services, printer services) that enable basic functionality of the original system 110. Thus, the original system 110 could not, for example, boot up, or start-up without the data (e.g., information) included in the original basis databases 125.

The original program databases 120 can include, or can be, for example, data (e.g., configuration data) associated with a program of the original system 110. In some embodiments, the data stored within the original program databases 120 can be referred to as system data.

Although not shown in FIG. 1, the original program databases 120 can be associated with executable files (e.g., a set of executable files). In some embodiments, the executable files can define at least a portion of the kernel associated with an operating system of the original system 110. The original program databases 120 associated executable files can collectively define at least a portion of an original program (not shown). In other words, in some embodiments, the original program can include a database component (i.e., the original program databases 120) and an executable file component (not shown). Thus, the original program databases 120 can be associated with one or more executable files. In some embodiments, the original program databases 120 can include, or can be, for example, configuration data associated with the executable files. In some embodiments, configuration data can include program instructions associated with the executable files. In other words, the original program databases 120 can describe, or can include, data associated with the functionality of the executable files.

In some embodiments, the executable files and/or the original program databases 120 can collectively be configured to operate on the original user databases 130. In other words, the executable files and/or the original program databases 130 can have functionality related to the original user databases 130.

In some of the embodiments discussed herein, the programs (e.g., the original program, the shadow program) have a database component and an executable file component. In some embodiments, one or more of the programs may only have an executable file component or a database component. For example, a program may only have an executable file component and configuration data (e.g., program instructions) associated with the executable file component can be integrated within the executable file component.

The databases and/or programs described herein can be defined based on a structure, and the structure can include data. In other words, the databases and/or programs described herein can have a structural component and a data component. The structural component can be associated with the data component, and vice versa. The structure of a database (such as the original program databases 120 and/or the original user databases 130) can be defined by rows and/or columns. The data stored in the database can be divided into fields by the structure of the database. For example, a field of a database can be at an intersection of a row of the database and at a column of the database, and can include a portion of data. In some embodiments, the one or more of the databases described herein can be, for example, an Oracle database, a DB2 database, and/or so forth. In some embodiments, the databases discussed herein can be referred to as repositories.

In some embodiments, a database that includes many databases can be referred to in a singular fashion as a database. In some embodiments, individual databases within a database can be referred to as portions of the database. More details related to the structure and/or data in databases and/or programs are described below.

The system upgrade module 170 includes a database comparator 160 configured to identify whether or not at least a portion of a database component of the original databases 115 are to be upgraded. The database comparator 160 can be configured to identify whether or not at least a portion of a database component of the original databases 115 are to be upgraded based on a comparison of the database component of the original databases 115 with at least one target upgrade database from the target upgrade databases 40 stored in a memory 174.

The upgrade of a database from the original system 110 (e.g., the original user databases 130, a database component of the original program databases 120) can include modifying (or not modifying) the structure and/or data of at least a portion of the database from the original system 110 so that the structure and/or data of the at least the portion of the database from the original system 110 matches (e.g., substantially corresponds with) the structure and/or data of at least one target upgrade database from target upgrade databases 40 stored in the memory 174 of the system upgrade module 170. In other words, the upgrade of the original user databases 130 can include modifying at least a portion of the original user databases 130 so that original user databases 130 can have the same form (i.e., structure) and/or substance (i.e., data) of at least one of the target upgrade databases 40. The upgrade of the database component of the original program databases 120 can include modifying at least a portion of the database component of the original program databases 120 so that the database component of the original program databases 120 can have the same form (i.e., structure) and/or substance (i.e., data) of at least one of the target upgrade databases 40.

The target upgrade databases 40 can represent the target upgrade structure and/or target upgrade data of one or more databases from the original system 110. In some embodiments, only a structure of a database from the original system 110 may be upgraded, or only data of a database from the original system 110 may be upgraded. For example, the structure of the original user databases 130 may be upgraded or only the data of the original user databases 130 may upgraded.

As shown in FIG. 1, the system upgrade module 170 includes a database module 161 configured to define the shadow databases 105 of the shadow system 100. The database module 161 includes a user database module 162 configured to define, at the shadow system 100, shadow user databases 150 having at least a portion of a structure and/or a portion of data that is an upgrade to (e.g., a modification of) at least a portion of a structure and/or a portion of data of the original user databases 130 of the original system 110. The shadow user databases 150 can be defined at the shadow system 100 in response to the database comparator 160 identifying the original user databases 130 of the original system 110 for upgrade. In other words, the user database module 162 can be configured to define the shadow user databases 150 at the shadow system 100 that correspond to the original user databases 130 of the original system 110 (or portion(s) thereof) when the original user databases 130 of the original system 110 (or portion(s) thereof) are identified for upgrade.

The database module 161 also includes a program basis module 163 configured to define, at the shadow system 100, shadow basis databases 145 having at least a portion of a structure and/or a portion of data that is an upgrade to (e.g., a modification of) at least a portion of a structure and/or a portion of data of the original basis databases 120 of the original system 110. Thus, the shadow basis databases 145 may correspond with the original basis database 125, but the shadow basis databases 145 may be an upgraded version of the original basis databases 125. In some embodiments, the shadow basis databases 145 can be identified for inclusion in the shadow system 100 by the basis database module 163.

Because the shadow system 100 includes the shadow basis databases 145, the shadow system 100 may be able to start/restart (e.g., change from a downstate to an upstate). In other words, the shadow basis databases 145 of the shadow system 100 can have the basic functionality and/or services that are needed for the shadow system 100 to be started/restarted during, for example, an upgrade process. The shadow basis databases 145 can be related to basic functionality of the shadow system 100 that enables starting/restarting of the shadow system 100. In some embodiments, the shadow basis databases 145 can include data related to one or more services (e.g., data port services, display services, communication services, hardware interfacing services) that enable basic functionality of the shadow system 100. Thus, the shadow system 100 could not, for example, boot up, or start-up without the information (e.g., data) included in the shadow basis databases 145.

In some embodiments, the shadow basis databases 145 include data that is separate from operating system executable files (e.g., system kernel) of the shadow system 100. In some embodiments, the shadow basis databases 145 can include data that is used by executable files of the operating system of the shadow system 100 to perform a start-up and/or restart (e.g., change from a downstate to an upstate) of the shadow system 100. In some embodiments, the shadow basis databases 145 can be based on a version of a program that matches a version of the operating system (and executable files thereof) for the shadow system 100 to be started and/or restarted. For example, if the shadow basis databases 145 have a structure and/or data that are associated with a version that is different (e.g., prior, outdated) to a version of the operating system (and executable files thereof) of the shadow system 100, the shadow system 100 (e.g., the operating system of the shadow system 100) may not be started and/or restarted. In some embodiments, when the shadow basis databases 145 and the program databases 140 are associated with an upgraded program version, the shadow system 100 can be started/restarted based on the upgraded program version.

In some embodiments, the shadow basis databases 145 can be a subset (e.g., a corresponding subset) of the original basis databases 125 included in the original system 110. In some embodiments, the shadow basis databases 145 can include data and/or a structure that corresponds with a subset of the data and/or structure of the original basis databases 125. In some embodiments, the shadow basis databases 145 included in the shadow system 100 can have the minimal information (e.g., functions, data, structure) that may be needed for the shadow system 100 to start/restart. In other words, the shadow basis databases 145 can include the core information needed (in conjunction with the information included in the shadow program databases 140) for the shadow system 100 to start/restart.

In some embodiments, the shadow basis databases 145 can operate in conjunction with the shadow program databases 140. In some embodiments, the shadow basis databases 145 can have data and/or structure configured to function in conjunction with data and/or structure the shadow program databases 140. In some embodiments, one or more functions of the shadow basis databases 145 can depend on one or more portions of the shadow program databases 140 to function and/or be used in a desirable fashion, and vice versa. In some embodiments, the shadow basis databases 145 and shadow program databases 140

(and/or associated executable files) can define a software platform that can be associated with a hardware platform.

Because the shadow system 100 can be started/restarted during an upgrade process, portions of the upgrade process that might have previously been performed during downtime of the original system 110 can be performed on the shadow system 100 (which can be an upgraded version of the original system 110) during an upstate and/or uptime of the original system 110. In other words, the original system 110 can remain in uptime while certain modifications that would otherwise be performed during downtime of the original system 110 can instead be performed on the shadow system 100 (which can be an upgraded version of the original system 110). For example, modifications that may have previously been performed on one or more portions of the original user databases 130 during downtime of the original user databases 130 may instead be performed on the shadow system 100 when the shadow system 100 is in an upstate (after being restarted). Thus, the original user databases 130 may remain accessible during an uptime of the original system 110 while modifications are instead being performed on the shadow databases 105 of the shadow system 100 which can be in an upstate.

Examples of some of the operations that can be performed at the shadow system 100 after the shadow system 100 has been started/restarted can include, for example, generation of enhancement objects/spots, enqueue generation, execution of after import methods (AIMs) and/or execution of programs after import (XPRAs), generation of ABAP loads, and/or so forth.

An AIM can be a method (e.g., an executable program) configured to modify one or more databases (e.g., shadow databases 105, user databases 115) so that the database(s) are compatible with, for example, a system upgrade. In some embodiments, an AIM can be configured to produce runtime information, and/or can be configured to generate code that can produce runtime information. In some embodiments, an AIM can be configured to facilitate transport and/or import of one or more of database(s). In some embodiments, an AIM can be configured to operate on multiple databases. For example, in some embodiments, a specific AIM can be configured to produce or make multiple databases compatible with a first platform (e.g., a DB2 platform) based on metadata associated with the multiple databases and/or based on metadata associated with multiple databases compatible with a second platform (e.g., an Oracle platform).

Similar to an AIM, an XPRA can be a method (e.g., an executable program) configured to modify one or more of the databases (e.g., shadow databases 105, user databases 115) so that the database(s) are compatible with, for example, a system upgrade. In some embodiments, an XPRA may not be configured to produce runtime information. In some embodiments, an XPRA can be configured as a single-use method configured to operate on a single database. For example, in some embodiments, an XPRA can be configured to convert data included in a database from a first format (e.g., an original format) associated with a first system (e.g., an original system) to a second format (e.g., a different format) associated with a second system (e.g., an upgraded system). In some embodiments, the XPRA may only be executed once, because after the data and/or structure of the database has been converted from the first format to the second format, the data and/or structure of the database object that is later manipulated by the second system will be compatible with the second system because the second system already functions based on the second format.

In some embodiments, one or more methods performed after start/restart can be configured to enhance (or generate an enhancement of) one or more of the databases (e.g., shadow databases 105, user databases 115) for a specific customized functionality (e.g., enhancement spots/objects) that may not be included as a standard feature in the database(s). In some embodiments, these types of methods can be referred to as enhancement spot methods.

In some embodiments, during ABAP load generation, one or more functions (e.g., ABAP programs/functions) associated with one or more of the databases (e.g., shadow databases 105, user databases 115) may be compiled. The compiled functions can be stored and later called for execution in an efficient fashion.

The database module 161 also includes a program database module 164 configured to define, at the shadow system 100, shadow program databases 140 having at least a portion of a structure and/or a portion of data that is an upgrade to (e.g., a modification of) at least a portion of a structure and/or a portion of data of the original program databases 120 of the original system 110. The shadow program databases 140 can be defined at the shadow system 100 in response to the database comparator 160 identifying the original program databases 120 of the original system 110 for upgrade. In other words, the program database module 164 can be configured to define the shadow program databases 140 at the shadow system 100 that correspond to the original program databases 120 of the original system 110 (or portion(s) thereof) when the original program databases 120 of the original system 110 (or portion(s) thereof) are identified for upgrade.

The database module 161 (e.g., the user database module 162 and/or the program database module 164) can be configured to manipulate one or more portions of the shadow databases 105 during an upgrade process. By performing certain portions of the upgrade process of the original system 110 using the system upgrade module 170 (e.g., the database module 161 of the system upgrade module 170) on the shadow databases 105 of the shadow system 100, the downtime of the original system 110 can be lower than (e.g., minimized) if a certain portions of the upgrade process are performed directly on the original databases 115 of the original system 110.

As shown in FIG. 1, the system upgrade module 170 includes a customization upgrade module 168. The customization upgrade module 168 is configured to modify one or more portions (e.g., a data portion, a structure portion) of the shadow databases 105 at the shadow system 100 based on one or more customizations implemented within the original databases 115. For example, one or more of the original program databases 120 may have a customized configuration implemented by a user of the original system 110. In some embodiments, the customizations can be based on one or more support packages (also can be referred to as enhancement packages) associated with an original program associated with the original program databases 120. These customized configuration(s) can be used to modify the shadow program databases 140 at the shadow system 100. As another example, one or more of the original basis databases 125 may have a customized configuration implemented by a user of the original system 110. In some embodiments, the customizations can be based on one or more support packages associated with the original basis databases 125. These customized configuration(s) can be used to modify the shadow basis databases 145 at the shadow system 100. More details related to modification of a shadow program database based on customizations to an original program database are discussed in connection with, for example, FIGS. 2 through 4.

The system upgrade module 170 includes an upgrade transfer module 192 configured to replace the original databases 115 with the shadow databases 105 after manipulation of the shadow databases 105 has been completed during an upgrade process. In some embodiments, the upgrade transfer module 192 is configured to dismantle (e.g., remove, disabled) the shadow system 100 included in the set of hardware 106. After the shadow system 100 has been dismantled, the original databases 115 can be replaced with the shadow databases 105 (which continue to exist (e.g., exist in memory) after the shadow system 100 has been dismantled). In some embodiments, the upgrade transfer module 192 can be configured to perform at least some of its functions during a downtime of the original system 110. More details related to replacement of the original databases and related to removal of at least some portions of a shadow system are discussed at least in connection with FIG. 4.

As shown in FIG. 1, the system upgrade module 170 includes an executable upgrade module 194. The executable upgrade module 194 is configured to handle an upgrade of one or more executable files (not shown) associated with the original system 110. In some embodiments, the executable files can define a program configured to operate on the original user databases 130.

The system upgrade module 170 can include a downtime execution module 196 configured to manage a downstate and/or an upstate of the shadow system 100 and/or a downtime (and downstate or upstate) and/or an uptime (and upstate) of the original system 110 during the upgrade process. Accordingly, the execution module 196 can be configured to trigger a start or a restart of the shadow system 100. During downtime, the original system 110 may be in a downstate or an upstate, and during the uptime, the original system 110 will be in an upstate. For example, the downtime execution module 196 can be configured to change (e.g., trigger a change of) the shadow system 100 from an upstate to a downstate during a portion of the upgrade process. Similarly, the downtime execution module 196 can be configured to change (e.g., trigger a change of) the original system 110 from uptime to a downtime during a portion of the upgrade process.

During downtime of the original system 110, one or more portions of the original system 110 may not accessible by a typical user. However, the shadow system 100 and/or the original system 110 may be accessible by, for example, an administrator when the shadow system 100 is in a downstate and/or during downtime of the original system 110. For example, when the original system 110 is in a downstate during downtime of the original system 110, data from the original user databases 130 of the original system 110 may not be accessed by a user of the original system 110. Instead, the original user databases 130 may be locked so that data cannot be retrieved from and/or stored to the original user databases 130.

During uptime of the original system 110, one or more portions of the original system 110 may be accessible by a typical user in a typical operational mode. In other words, the original system 110 may be actively used during uptime. For example, when the original system 110 is in an upstate during uptime of the original system 110, data from the original user databases 130 of the original system 110 may accessed (e.g., modified) by a user of the original system 110.

In some embodiments, the downtime execution module 196 can be configured to suspend one or more batch jobs of the original system 110 when (e.g., before) a downtime of the original system 110 is initiated. In some embodiments, the downtime execution module 196 can be configured to log-off one or more user from the original system 110 before a downtime of the original system 110 is initiated.

Portions (e.g., steps) of an upgrade process can be performed when the shadow system 100 and/or the original system 110 are in an upstate or in a downstate. In other words, portions of the upgrade process can be performed during various portions of the upstate or downstate of the upgrade of the shadow system 100 and/or the original system 110. Examples related to an upgrade process are described in more detail in connection with the figures below.

The system upgrade module 170 can be, or can be included within, for example, a client device and/or a server device. In some embodiments, the system upgrade module 170 can be, or can be included within, for example, a wired device and/or a wireless device (e.g., wi-fi enabled device) and can be, for example, a computing entity (e.g., a personal computing device), a mobile phone, a personal digital assistant (PDA) and/or so forth. The system upgrade module 170 can be configured to operate based on one or more platforms (e.g., one or more similar or different platforms) that can include one or more types of hardware, software, firmware, operating systems, runtime libraries, and/or so forth. In some embodiments, the system upgrade module 170 can be defined using ABAP and/or can be related to a NetWeaver platform.

Although not shown, in some embodiments, the memory 174 can be implemented as more than one memory component (e.g., more than one random-access memory (RAM) component or disk drive memory) within the system upgrade module 170. In some embodiments, the memory 174 can be, or can include, a non-local memory (e.g., a memory not physically included within the system upgrade module 170) within a network (not shown). For example, the memory 174 can be, or can include, a memory shared by multiple system upgrade modules (not shown) within a network.

Although not shown, the system upgrade module 170 can be configured to operate within an environment that includes an operating system. In some embodiments, the operating system can be configured to facilitate the functions of the system upgrade module 170.

In some embodiments, the system upgrade module 170 can represent, or can be included within, a cluster of modules/devices. In such an embodiment, the functionality and processing of the system upgrade module 170 (e.g., the database module 162 of the system upgrade module 170) can be distributed to several modules/devices of the cluster of modules/devices.

In some embodiments, one or more portions of the components shown in the system upgrade module 170 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the database module 162 can be, or can include, a software module configured for execution by at least one processor (not shown). In some embodiments, the functionality of the components can be included in different modules and/or components than those shown in FIG. 1. For example, although not shown, the functionality of the database comparator 160 can be included in a different module than the database comparator 160, or divided into several different modules (not shown).

In some embodiments, the system upgrade module 170, the shadow system 100, and/or the original system 110 can be included within a network that can include multiple devices (e.g., multiple client devices, multiple server devices). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet. Also, although not shown in FIG. 1, the system upgrade module 170 can be configured to function within various types of network environments.

Figure 2:
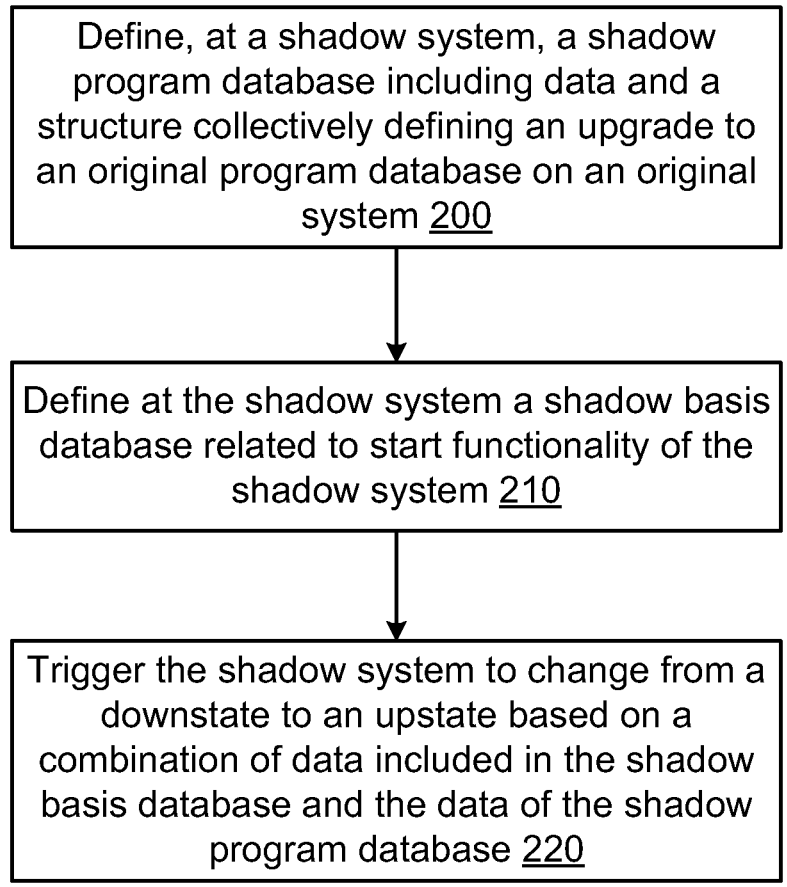
FIG. 2 is a flowchart that illustrates a method for upgrading the original system.

FIG. 2 is a flowchart that illustrates a method for upgrading the original system. In some embodiments, portions of the flowchart can be implemented by (e.g., managed by), for example a system upgrade module such as the system upgrade module 170 shown in FIG. 1. As shown in FIG. 2, a shadow program database including data and a structure collectively defining an upgrade to an original program database on an original system is defined at a shadow system (block 200). The original program database can be identified for upgrade by a database comparator, such as database comparator 160 shown in FIG. 1, based on a comparison of the original program database with a target upgrade database. In some embodiments, the original program database can be one of several original program databases identified for upgrade by the database comparator. In some embodiments, the shadow program database can be defined by a program database module such as program database module 164 shown in FIG. 1.

In some embodiments, the shadow system can be implemented within a set of hardware and/or software associated with the original system. In some embodiments, the original program database can be associated with one or more executable files. The original program database and the executable files can collectively define at least a portion of an original program such as a database management program, a financial program, a human resources program, and/or so forth.

A shadow basis database related to start functionality of the shadow system is defined at the shadow system (block 210). The original basis database can be defined by the basis database module 163 shown in FIG. 1. In some embodiments, the shadow basis database can include, for example, data related to one or more services (e.g., data port services, display services, communication services, hardware interfacing services) that enable basic functionality of the shadow system and enable starting/restarting of the shadow system.

The shadow system is triggered to change from a downstate to an upstate based on a combination of data included in the shadow basis database and the data of the shadow program database (block 220). The shadow system can be triggered to change from the downstate to the upstate by the downtime execution module 196 shown in FIG. 1. In some embodiments, the shadow program database can be restarted so that one or more functions that are typically performed during downtime of the original system may be performed in the restarted shadow system during uptime of the original system.

FIG. 3A illustrates upstates and downstates of a shadow system 300 during an upgrade process. FIG. 3B illustrates uptime and downtime of an original system 310 during the upgrade process. As shown in FIG. 3A and in FIG. 3B, time is increasing to the right. Stages of the upgrade process are shown in both FIGS. 3A and 3B. Specifically the stages of the upgrade process include a shadow creation and adjustment stage, a replacement stage, a structure adjustment stage, a data import stage, an AIM execution stage, and a post-upgrade activity stage. The description associated with FIGS. 3A and 3B includes a brief overview of the operations associated with an upgrade process. A specific example of an upgrade process including more details related to the operations performed during the stages of the upgrade process is described in connection with FIGS. 4A through 4D.

As shown in FIG. 3A and FIG. 3B, the shadow creation and adjustment stage of the upgrade process is started at time T1. As shown in FIG. 3A, the shadow system 300 can be in a downstate during portions of the shadow creation and adjustment stage of the upgrade process. Also as shown in FIG. 3A, the shadow system 300 changes to an upstate between times T2 and T3, and between times T5 and T6. As shown in FIG. 3B, the original system 310 can be in uptime (and in an upstate) during the shadow creation and adjustment stage of the upgrade process.

During the shadow creation adjustment stage (e.g., during an initial portion of the shadow creation and adjustment stage), a shadow system can be created (e.g., defined), and one or more shadow program databases, shadow basis databases, and/or shadow user databases are defined within the shadow system. In some embodiments, the shadow basis database(s) can correspond with one or more original basis databases of the original system. In some embodiments, the shadow program database(s) can correspond with one or more original program databases of the original system and/or the shadow user database(s) can correspond with one or more original user databases of the original system. In some embodiments, the databases of the shadow system 300 can be created using, for example, R3load.

In some embodiments, the shadow program databases, shadow basis databases, and/or shadow user databases can be defined, at least in part, based on a comparison with one or more upgrade target databases. Specifically, the comparison can be performed during the initial portion of the shadow creation and adjustment stage while the shadow system 300 is in the upstate between times T2 and T3. The comparison can be performed to identify one or more portions of the shadow system (e.g., shadow program databases, shadow basis databases, and/or shadow user databases) that are to be upgraded. At time T2, the shadow system 300 can be initially started based on a base program version that is an upgrade to a program version of the original system 310, but does not include customizations based on, for example, support packages (which may be included in with the program level of the original system 310).

In some embodiments, the portion of the original user database that is transferred to (e.g., identified for transfer to) the shadow system 300 as a shadow user database can be a subset of the original user database of the original system 310. In other words, the shadow user database can be a subset of the original user database of the original system 310 that is mirrored in the shadow system 300. In some embodiments, the portions of the original user database that are mirrored in the shadow system 300 can be determined based on a variety of rules including database size thresholds, the amount of data that is projected to be modified in the original user database, whether or not the original user database will be upgraded, and/or so forth. For example, only original user databases that are smaller than a specified database size and/or that are identified for upgrade may be transferred into the shadow system 300 for mirroring as a shadow user database.

In some embodiments, the shadow system can also include one or more shadow executable files that are upgrades to (and can correspond with) original executable files included in an original system. In some embodiments, the shadow system can include default data associated with a base version (without customizations) of an upgrade to the original system. In some embodiments, the shadow system can be defined within a set of hardware associated with the original system.

During the structure adjustment portion of the shadow creation and adjustment stage (between times T3 and T4), the structure of one or more databases (e.g., shadow program databases, shadow basis databases, and/or shadow user databases) of the shadow system may be calculated (e.g., defined and/or modified). In some embodiments, the structure of the databases included in the shadow system can be upgrades to databases included in the original system.

Starting at time T4, the content adjustment portion of the shadow creation and adjustment stage can include initially transferring data into one or more database structures and/or modifying data included in the one or more database structures. Thus, during the content adjustment portion, new data associated with an upgrade can be imported into (and used to modify one or more shadow databases of) the shadow system 300, and also during the content adjustment portion, the content (e.g., data) of one or more of the databases may be modified.

In some embodiments, the initial import can be performed by, for example, a data replicator (not shown in FIG. 1) and/or the upgrade transfer module 192 shown in FIG. 1. During the content adjustment portion of the shadow creation adjustment stage, default data that can be included in one or more shadow program databases, shadow basis databases, and/or one or more shadow user databases can be transferred (e.g., initially transferred) from the original system 310 and/or an upgrade DVD. Specifically, the default data included in the one or more shadow user databases can be imported from one or more databases of the original system 310. In some embodiments, the shadow program databases, the shadow basis databases, and/or the shadow user databases can have a default structure and/or data associated with a particular program version that is a target program version of the original system 310.

Thus, between time T3 and time T5 (during the structure adjustment and content adjustment portions of the shadow creation adjustment stage), one or more of the shadow program databases, shadow basis databases, and/or shadow user databases (or a portion thereof) can be created (e.g., defined) and/or modified (e.g., adjusted, modified using an alter table statement) from a default or base version (without customizations) of an upgrade (e.g., target version of the original system) to a customized version of the upgrade. In some embodiments, the customizations can be related to support packages (also can be referred to as enhancement packages) associated with the upgrade (e.g., target version of the original system). In some embodiments, the customizations can be related to support packages originally loaded onto (e.g., or later loaded onto) the shadow system 300 using, for example, a DVD. Thus, the customizations can be bound into the upgraded program level of the shadow system 300. In some embodiments, the shadow program databases, shadow basis databases, and/or shadow user databases can be processed based on information loaded into the shadow system from, for example, an upgrade DVD, or other data repository related to an upgrade.

As a specific example, during a first portion of the shadow creation and adjustment stage (e.g., between times T1 and T3), the shadow program databases, shadow basis databases, and/or shadow user databases of the shadow system 300 can be associated with a program level "5.0," which is an upgrade to the original system 310 which can be associated with program level "4.0" (which can be a prior program level). Thus, at time T2, the shadow system 300 can be started (e.g., initially started) based on the upgraded program level "5.0" without customizations associated with, for example, a support package.

During a second portion of the shadow creation adjustment stage (e.g., between times T3 and T5), the shadow system 300 (e.g., the shadow program databases, shadow basis databases, and/or shadow user database) can be modified with customizations so that the shadow system 300 includes support packages at the program level "5.0." If the support packages are represented by the characters "SPXY," the support packages and the program level "5.0" can collectively define a program version "5.0 SPXY." Thus, at time T5, the shadow system 300 can be started (e.g., restarted) based on the upgraded program level "5.0" with customizations associated with, for example, a support package. In some embodiments, the customizations can be implemented using, for example, the customization upgrade module 168 of the system upgrade module 170 shown in FIG. 1.

In some embodiments, one or more program objects (e.g., program data) can be imported into the shadow program databases between times T3 and T5. In some embodiments, the one or more program objects that are imported and the shadow program database can be content of customizations (e.g., support packages) that can be bound to an upgraded program version of the shadow system 300.

As shown in FIG. 3A, at time T5, the shadow system 300 is changed from a downstate to an upstate. The shadow system 300 can be changed from the downstate to the upstate because the shadow system 300 has shadow basis databases including information (e.g., basic information) needed to start/restart the shadow system 300. In this embodiment, the shadow system 300 is restarted at time T5 (after being initially started at time T2) based on customizations (e.g., support packages) included in the shadow system 300 between times T3 and T5. Without the shadow basis databases, the shadow system 300 could not be started at time T2 and/or restarted at time T5. In some embodiments, the program version (which includes a program level and customizations such as support packages) of the shadow system 300 at time T5 can correspond with a program version of an operating system (and executable files thereof) of the shadow system 300 so that the shadow system 300 can be start/restarted. If the program version of the shadow system 300 did not match the program version of the operating system of the shadow system, the shadow system 300 could not be restarted.

During the activities portion of the shadow creation and adjustment stage (between times T5 and T6), certain after import methods (AIMs) and/or execution of programs after import (XPRAs) enabled for (and/or designated for) execution within the shadow system can be executed within the shadow system during the initial import stage and/or the data import stage. As shown in FIG. 3A, the shadow system 300 can be in an upstate during the activities portion of the shadow creation an adjustment stage. The shadow system 300 can be started at time T5 based on an upgraded program level with customizations associated with, for example, a support package. In some embodiments, if the shadow system is based on ABAP, certain ABAP loads can be generated within the shadow system during the initial import stage and/or the data import stage. In some embodiments, additional operations that can be performed at the shadow system 300 after the shadow system 300 is restarted can include, for example, generation of enhancement objects/spots, enqueue generation, execution of after import methods (AIMs) and/or execution of programs after import (XPRAs), and/or so forth.

As shown in FIGS. 3A and 3B, the replacement stage of the upgrade process can be started at time T6. As shown in FIG. 3A, the shadow system 300 can be in a downstate and the original system 310 can also be in a downstate. During the replacement stage of the upgrade process, the shadow system 300 can be dismantled (and thus does not exist as a functional system) and the remaining portions of the shadow system 300 that are upgrades to the original system 310 can be moved into the original system 310 as an upgraded system 320. Although not shown in FIGS. 3A and 3B, in some embodiments, the dismantling can occur during uptime of the original system 310 between the shadow creation and adjustment stage and the replacement stage. In other words, the portions of the shadow system 300 that are upgrades to the original system 310 can replace the portions of the original system 310. Portions of the original system 310 that are not upgraded (i.e., are not subject to upgrade) may not be replaced by portions of the shadow system 300. In this embodiment, at the end of the replacement stage, if remaining portions of the shadow system 300 are within a set of hardware that is common to the original system 310, the remaining portions of the shadow system 300 may be removed from that set of hardware.

The dashed lines shown in FIG. 3B illustrate times during which the original system 310 is in an upstate, but is in downtime. Specifically, the original system 310 can be in downtime (but in an upstate) between times T7 and T8, between times T10 and T11.

As shown in FIGS. 3A and 3B, the upgrade process includes a structure adjustment stage and the data import stage after the replacement stage. During the structure adjustment stage of the upgrade process, the structure of the original user databases and the structure of the original basis databases that are included in the original system 310 may be upgraded. Specifically, the structure of the original user databases can be upgraded to a target structure associated with an upgrade, and the structure of the original basis databases can be upgraded to a target structure associated with the upgrade. As shown in FIG. 3B, at least a portion of the adjustment stage can be performed while the original system 310 is in downtime (but in an upstate) between times T7 and T8.

During the data import stage, data can be initially transferred into one or more database structures and/or data included in (transferred into) the one or more database structures can be modified. Thus, during the data import stage, new data associated with an upgrade can be imported into (and used to modify one or more user databases of) the original system 310, and also during the data import stage, the content (e.g., data) of one or more of the databases may be modified. During the data import stage, default data that can be included in one or more original program databases, original basis databases, and/or one or more original user databases can be transferred into the original system 310 from, for example, an upgrade DVD. In some embodiments, modifications of the data included in databases of the original system 310 can be performed to upgrade the data based on, for example, customizations implemented by a user of the original system 310. In some embodiments, at least some portions of the data import stage can be performed by, for example, a data replicator (not shown in FIG. 1) and/or the upgrade transfer module 192 shown in FIG. 1.

As shown in FIGS. 3A and 3B, the AIM execution stage of the upgrade process can be started at time T10. During the AIM execution stage starting at time T10, the upgraded system 320 (which was previously the original system 310 until upgraded) can be in an upstate, but the original system 310 will not be in downtime. In some embodiments, during the AIM execution stage certain AIMs and/or XPRAs that were not enabled (and/or designated) for execution within the shadow system 300 during, for example, the activities portion of the shadow creation and adjustments stage can be executed within the upgraded system 320 during the AIM execution stage. Thus, a first portion of AIMs and/or XPRAs can be executed between times T5 to T6 and a second portion of the AIMs and/or XPRAs can be executed between times T10 to T11. In some embodiments, final modifications (e.g., customization) of the data included in databases of the original system 310 can be performed to upgrade the data based on, for example, customizations implemented by a user of the original system 310 between times T11 and T12.

As shown in FIGS. 3A and 3B, the post-upgrade activity stage of the upgrade process can be started at time T12. At the start of the post-upgrade activity stage, the upgraded system 320 (which was previously the original system 310 until upgraded) can be changed from downtime (in an upstate) to uptime (in an upstate).

During the post-upgrade activity stage, the upgraded system 320 can be unlocked for use by one or more users and batch jobs or previously suspended during the recording stage can be restarted by, for example, an administrator. In some embodiments, after the AIM execution stage of the upgrade process has been completed, an administrator can be notified that post-upgrade activities may be initiated.

Although the stages shown in FIG. 3A and in FIG. 3B are shown as discrete stages of an upgrade process, in some embodiments one or more of the stages may overlap with another stage of the upgrade process. In some embodiments, the stages (or functions thereof) described in connection with FIGS. 3A and 3B may be performed in a different order than that shown in FIGS. 3A and 3B. In some embodiments, the relative sizes of each of boxes associated with the stages shown in FIGS. 3A and 3B may not be representative of the relative durations of the respective stages.

FIG. 4, which includes FIGS. 4A through 4D, is a collection of diagrams that illustrate stages of an upgrade process of an original system 410 using a shadow system 400. In these diagrams, the shadow system 400 is shown on the left, and the original system 410 is shown on the right. In some embodiments, one or more portions of the upgrade process can be implemented using a system upgrade module, such as system upgrade module 170 shown in FIG. 1.

Figure 4A:
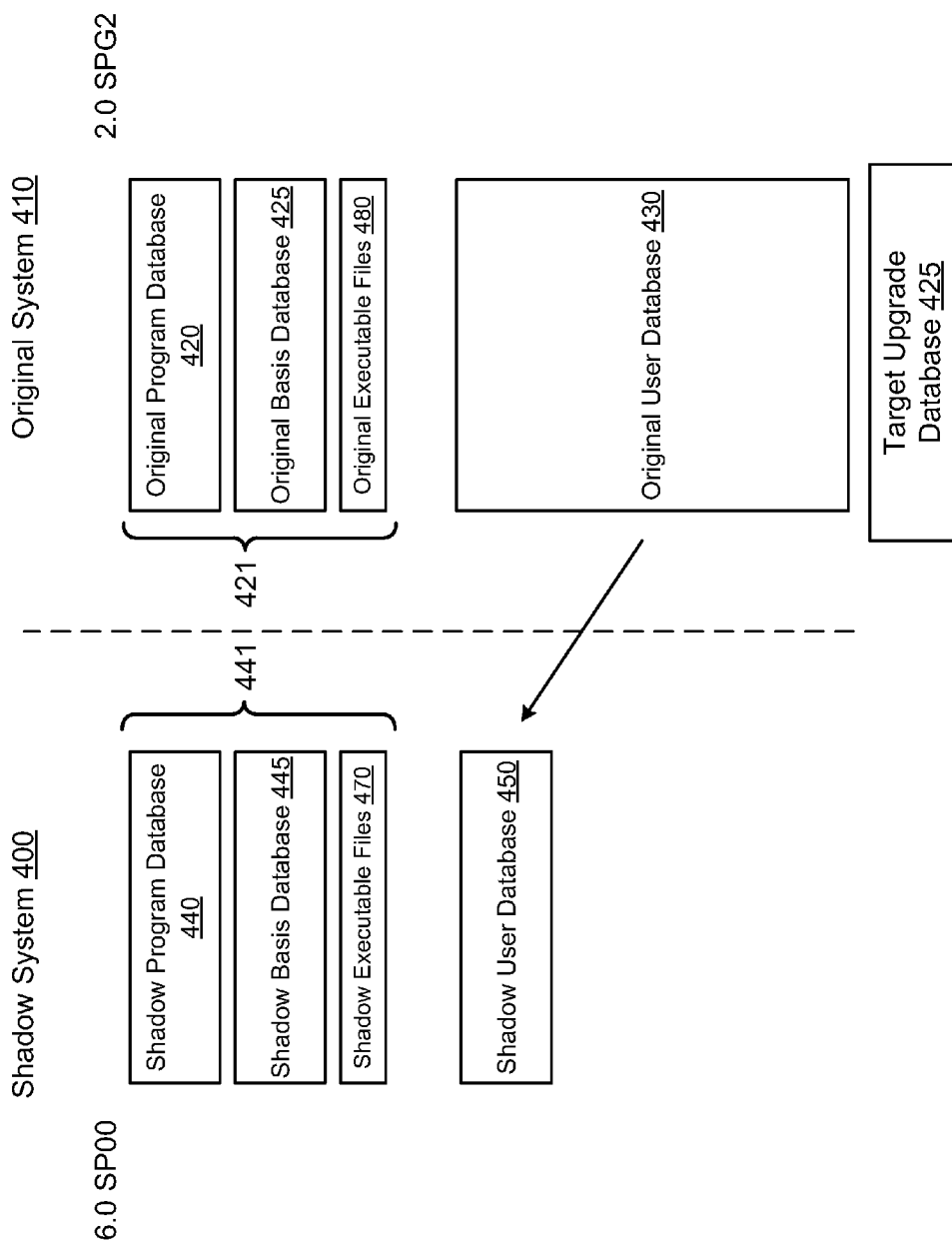
FIG. 4A is a diagram that illustrates a shadow program database, a shadow basis database, shadow executable files, and a shadow user database defined within a shadow system.

FIG. 4A is a diagram that illustrates a shadow program database 440, a shadow basis database 445, shadow executable files 470, and a shadow user database 450 defined within a shadow system 400. As shown in FIG. 4A, the shadow program database 440 and shadow executable files 470 collectively define a shadow program 441. Also, as shown in FIG. 4A, an original program 421 (which corresponds with the shadow program 441) includes an original program database 420 and original executable files 480, which collectively define the original program 421. The shadow program 441 can be an upgrade to (e.g., an upgrade to a program version of) the original program 421 included in the original system 410. As shown in FIG. 4A, the shadow system 400 (e.g., the shadow program 441) is a base version (without customizations) of an upgrade to the original program 421. The shadow executable files 470 can represent upgraded executable files of the original executable files 480. In some embodiments, the portion of the upgrade process depicted in connection with FIG. 4A can be part of at least a portion of a shadow creation and adjustment stage of the upgrade process. The original program database 420 can be referred to as a database component of the original program 421.

The original program 421 is configured to operate on an original user database 430. The original user database 430 has a structure and data stored within the structure. In some embodiments, the original user database 430 can be, or can include, for example, various types of customer data.

In some embodiments, the shadow program database 440 can be defined by a program database module such as program database module 164 shown in FIG. 1. In some embodiments, the shadow system 400 shown in FIG. 4A can be defined during times T1 through T3 of the shadow creation and adjustment stage shown in FIG. 3A.

As shown in FIG. 4A, the original system 410 is based on program version 2.0 SPG2, which includes a program level and customizations based on support packages. The characters "2.0" can represent a particular program level, and the characters "SPG2" can represent customizations to the program level 2.0 based on support packages. In some embodiments, the customizations may be chosen from a library of potential support packages that can be associated with a particular program level. Accordingly, the customizations can depend on configurations of particular support packages implemented by a user with respect to the particular program level.

In this embodiment, the shadow system 400 is associated with upgrade version "6.0 SP00", which includes a program level, but does not include customizations based on support packages. The characters "6.0" can represent a program level that is an upgrade to the program level "2.0" of the original system 410. The characters "SP00" can represent that the shadow system 400 is based on a base program level (albeit an upgraded program level) without customizations to the program level based on support packages.

Although not shown in FIG. 4A, the shadow program database 440 can include a structure and data that is stored within the structure. The data that is stored within the structure can, in some embodiments, be upgrades corresponding with data and/or structure of the original program 421. The structure and data of the shadow program database 440 can be associated with a shadow program level and can be referred to as a shadow program portion of the shadow program database 440.

FIG. 4A also illustrates creation of a shadow user database 450 within the shadow system 400. As illustrated in FIG. 4A, the shadow user database 450 is a subset of the original user database 430. In other words, the shadow user database 450 only mirrors a portion of the original user database 430. In some embodiments, the portions of the original user database 430 that are mirrored in the shadow system 300 can be determined based on a variety of rules including user database size thresholds, the amount of data that is projected to be modified in the original user database 430, whether or not the original user database 430 will be modified for the upgrade, and/or so forth.

In this embodiment, the shadow user database 450 has a structure that corresponds with the original user database 430 to be upgraded. In some embodiments, the shadow user database 450 can be defined by a user database module such as user database module 162 shown in FIG. 1. In some embodiments, the portion of the upgrade process depicted in connection with FIG. 4A can be part of the shadow creation and adjustment stage of the upgrade process (e.g., during times T3 through T5 of the shadow creation and adjustment stage shown in FIGS. 3A and 3B).

The shadow user database 450 can be defined based on a comparison of the original user database 430 with a target upgrade database 425. Although not shown in FIG. 4A, in some embodiments the target upgrade database 425 can include multiple target upgrade databases. The target upgrade database 425 can represent a target upgrade structure and/or data of the original user database 430. In some embodiments, the comparison of the original user database 430 with a target upgrade database 425 can be performed by a database comparator such as database comparator 160 shown in FIG. 1.

In some embodiments, when the shadow system 400 is created, the shadow system 400 can be in an upstate. In some embodiments, the shadow system 400 can be configured to start-up (e.g., start-up at time T2 shown in FIG. 3A) and operate on the program level 6.0 until the shadow system 400 is modified based on customizations (e.g., SPG2).

Because the shadow system 400 is a temporary system created for use during an upgrade process of the original system 410, the shadow system 400 may not be accessible by users of the original system 410. Thus, the shadow system 400 may be changed to an upstate, but may not have uptime. Also, the original system 410 can be in an upstate (and in uptime) when the shadow system 400 is created and can be in productive use by one or more users. In other words, the original system 410 can be accessible and used in a typical operational mode while the shadow system 400 is being created. In some embodiments, the original system 410 can be changed from an upstate to a downstate during the portions of the upgrade process described in connection with FIG. 4A.

Figure 4B:
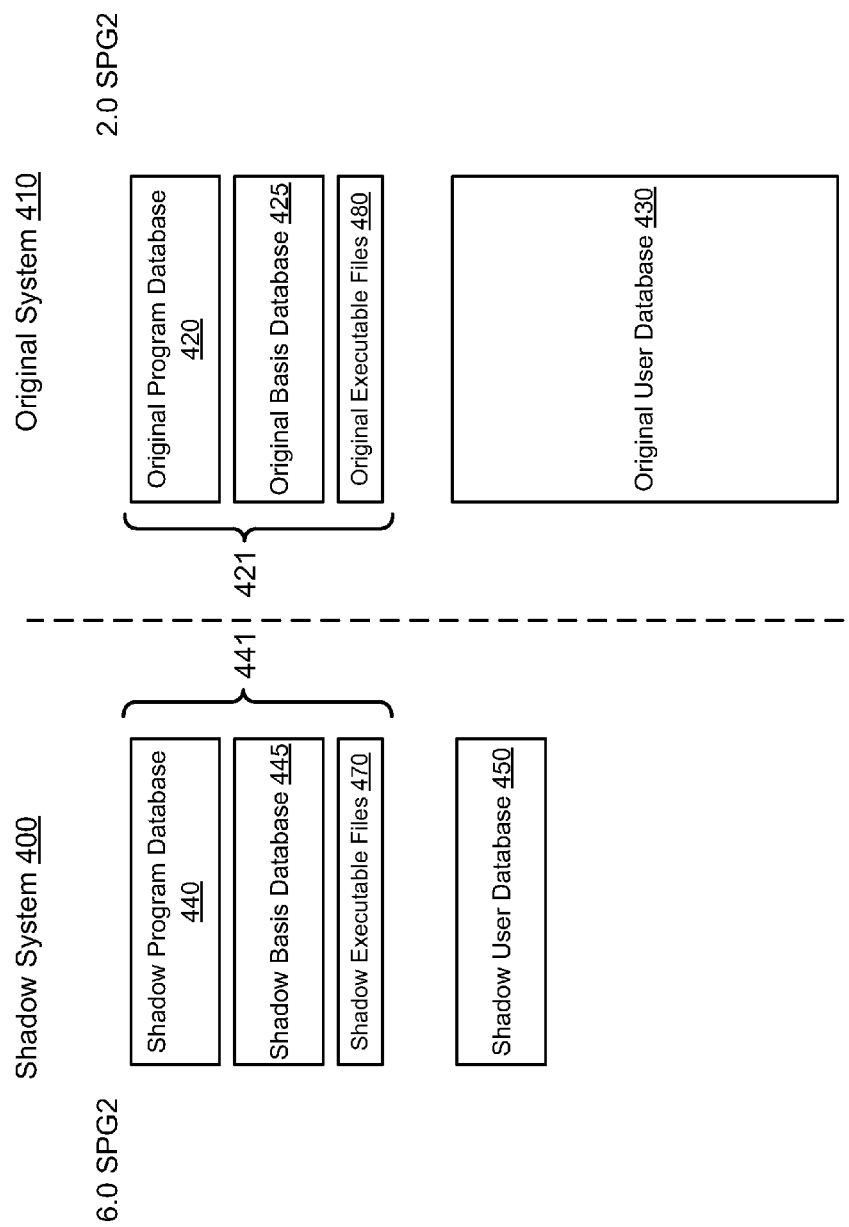
FIG. 4B is a diagram that illustrates the shadow system shown in FIG. 4A after the upgraded program level of the shadow system has been modified based on customizations.

FIG. 4B is a diagram that illustrates the shadow system 400 shown in FIG. 4A after the upgraded program level of the shadow system 400 has been modified based on customizations. The program version of the shadow system 400, which is an upgrade to the original system 410, is represented as program version 6.0 SPG2. In this embodiment, the characters "6.0" represent a particular program level (i.e., the upgraded program level), and the characters "SPG2" represent the customizations based on support packages that correspond with the support packages SPG2 of the original system 410 (e.g., the original program 421). At this point in the upgrade process, the data included in the structure of the shadow program database 440 (which collectively define the shadow program portion of the shadow program database 440) corresponds with the original program 421.

After the shadow system 400 has been modified based on customizations, the shadow system 400 can start-up/restart (e.g., start-up/restart at time T5 shown in FIG. 3A) and/or operate in an upstate based on the program level 6.0 SPG2.

During at least some portions of the upgrade process shown in FIG. 4B, the shadow system 400 can be in a downstate. Specifically, the shadow user database 450 and/or shadow basis database 445 can be created while the shadow system 400 is in the downstate, and the shadow program database 440 and/or shadow basis database 445 can be modified with a default structure and default data associated with support packages while the shadow system 400 is in the downstate. The original system 410, however, can remain in an upstate (and in uptime) while the original system 410 can be productively used by one or more users during these portions of the upgrade process shown in FIG. 4B. Although not shown, in some embodiments, the original system 410 can be changed from an upstate to a downstate during the portions of the upgrade process described in connection with FIG. 4B.

In some embodiments, the customizations associated with one or more support packages of the program version 6.0 SPG2 can be made to the shadow program database 440, the shadow basis database 445, the shadow executable files 470 and/or the shadow user database 450, while the shadow system 400 is in a downstate (i.e., between times T3 and T4 shown in FIG. 3A) after initially being started (i.e., between times T2 and T3 shown in FIG. 3A) during the shadow creation and adjustment stage of the upgrade process. In some embodiments, the customizations associated one or more support packages of the program version 6.0 SPG2 can be made to the shadow program database 440, the shadow basis database 445, the shadow executable files 470 and/or the shadow user database 450 before the shadow system 400 is restarted (i.e., restarted at time T5). The customizations associated with one or more support packages of the program version 6.0 SPG2 can be made so that the shadow system 400 can be started/restarted while the shadow system 400 is the upgraded program version (i.e., program version 6.0 SPG2).

As shown in FIG. 4B, the shadow program database 440 corresponds with the original program database 420, albeit the shadow program database 440 is an upgraded version of the original program database 420. Similarly, the shadow executable files 470 correspond with the original executable files 480, albeit the shadow executable files 470 are an upgraded version of the original executable files 480. Also, the shadow basis database 445 corresponds with the original basis database 425, albeit the shadow basis database 445 is an upgraded version of the original basis database 425.

Although not shown in FIG. 4B, in some embodiments, the shadow system 400 and the original system 410 can be configured to operate within a common system, such as a data center, a server farm, and/or so forth. In some embodiments, if the shadow system 400 is a software system, the shadow system 400 (e.g., the shadow program database 440, the shadow basis database 445, the shadow executable files 470), as well as customization thereof, can be created using an installation from, for example, a memory (e.g., a hard drive), a computer-readable medium (e.g., a digital versatile disc (DVD)), and/or so forth.

Also, in some embodiments, the shadow system 400 (e.g., any portion of the shadow program 441 and/or the shadow user database 450) can be initially loaded with data from the original system 410 and/or modified based on data from the original system 410 (e.g., between times T3 and T5 shown in FIG. 3A). Specifically, the data of the original system 410 can be imported into the shadow system 400. In some embodiments, after the shadow system 400 has been loaded with and/or modified with data from the original system 410 the shadow system 400 can be adjusted with customizations associated with support packages (as described above).

For example, data from the original user database 430 (or an upgrade repository such as a DVD) can be imported into the upgraded structure of the shadow user database 450. The data of the original user database 430 can be imported into the shadow user database 450 so that the data can be included in the shadow user database 450. Because the structure of the shadow user database 450 can be different than the structure of the original user database 430 (to which the structure of the shadow user database 450 corresponds), the data can be modified when included in the structure of the shadow user database 450. Accordingly, the data included in the structure can be referred to as modified data. In some embodiments, the modified data can be identical to the data, but can be modified in form only when included in the structure of the shadow user database 450. In some embodiments, the data can be substantively modified (e.g., modified by adding data, modified by removing data) when included in the structure of the shadow user database 450 to define the modified data. In some embodiments, after the shadow user database 450 has been initially loaded with and/or modified with data from the original system 410 the shadow user database 450 can be adjusted with customizations associated with support packages (as described above).

Although not shown in FIG. 4B, in some embodiments, the entire original user database 430 can be modified in substance (e.g., modified by adding data, modified by removing data) and/or modified in form (e.g., modified by rearranging data) when moved into (e.g., copied into) the shadow user database 450. In such embodiments, the modification of the data from the original user database 430 may be necessitated because the structure of the shadow user database 450 may not match the structure of the original user database 430.

In some embodiments, modifying the default data in the shadow system 400 (e.g., any portion of the shadow program 441 and/or the shadow user database 450) with the data included in the original system 410 can enable defining of the shadow system 400 based on a standard configuration. In other words, the shadow system 400 can be initially created using the default data associated with a base program level and/or support package combination that does not have to be customized to the original system 410. Instead, the customizations implemented by, for example a user and/or an owner of the original system 410 can be used to customize the shadow system 400 so that the shadow system 400 corresponds with the original system 410 with a desirable level of accuracy.

During the modification of data of the shadow system 400 based on data from (e.g., data imported from) the original system 410, the shadow system 400 can be in an upstate and the original system 410 can continue to operate in an upstate (and uptime). In some embodiments, the original system 410 and/or the shadow system 400 can be changed from an upstate to a downstate during the modification of data of the shadow system 400 based on data from (e.g., data imported from) the original system 410. In some embodiments, the data from the original system 410 can be used to modify the shadow system 400 using a data replicator (not shown) and/or the upgrade transfer module 192 shown in FIG. 1.

In some embodiments, after data has been initially loaded into the shadow system 400 and the shadow system 400 has been modified with, for example, customizations (if any), the shadow system 400 can be started/restarted (i.e., restarted at time T5 shown in FIG. 3A). Accordingly, the shadow system 400 can be in an upstate after being restarted and can be in an activities portions of a shadow creation and adjustment stage (as shown in FIG. 3A). In some embodiments, certain after import methods (AIMs) and/or execution of programs after import (XPRAs) enabled for (and/or designated for) execution within the shadow system 400 can be executed within the shadow system 400 during the activities portion of the shadow creation and adjustment stage. Specifically, import methods designated for execution after the data from the original system 410 has been imported into the shadow system 400 as described in connection with FIG. 4B. In some embodiments, if the shadow system 400 is based on ABAP, certain ABAP loads can be generated within the shadow system 400. In some embodiments, operations that can be performed at the shadow system 400 after the shadow system 400 has been restarted can include, for example, generation of enhancement objects/spots, enqueue generation, and/or so forth.

Accordingly, both the shadow system 400 and the original system 410 can be configured to operate in an upstate. The original system 410 can also be operating during uptime. The shadow system 400 can be started and configured to operate based on an upgraded program version (i.e., program version 6.0 SPG2) of the original program version (i.e., original program version 2.0 SPG2) used by the original system 410. Also, the shadow user database 450 is an upgraded version of the original user database 430. In some embodiments, the shadow system 400 can be maintained or triggered to start in the upstate by a downtime execution module such as downtime execution module 196 shown in FIG. 1.

Because the original system 410 can be configured to operate in an upstate and in uptime during an activities portion of the shadow creation and adjustment stage of the upgrade process, changes to, for example, the original user database 430 of the original system 410 may not be reflected in the shadow user database 450 of the shadow system 400. Accordingly, before replacement of the original system 410 with the shadow system 400, database triggers included in the original system 410 can be used to detect changes to the original user database 430 of the original system 410. The changed databases of the original system 410 can be handled during downtime of the original system 410 (i.e., during the replacement stage of the upgrade process). In some embodiments, the changed databases of the original system 410 can be transferred to the shadow system 400 before replacement of the original system 410 with the shadow system 400 (during the replacement stage of the upgrade process).

For example, a first portion of the original user database 430 and a second portion of the original user database 430 may be a mirrored in the shadow user database 450. Database triggers can be included in the original system 410 can monitor whether or not changes are made to the first portion of the original user database 430 and/or the second portion of the original user database 430 during the upgrade process. If a change is made to the first portion of the original user database 430, the portion of the shadow user database 450 that corresponds with the first portion of the original user database 430 may be discarded. If no changes are made to the second portion of the original user database 430, the portion of the shadow user database 450 that corresponds with the second portion of the original user database 430 may replace the second portion of the original user database during the replacement stage of the upgrade process.

Also, in some embodiments, the shadow program database 440 and/or shadow basis database 445 can be updated with the new support packages not already included in the original program database 420 before and/or after the shadow user database 450 is included in the shadow system 400. Specifically, the shadow program database 440 and/or shadow basis database 445 can be modified to include a structure and data that correspond with the support packages not already included in the original program database 420. The structure and data can collectively be referred to as a shadow support package portion of the shadow program database 440 and/or shadow basis database 445. In some embodiments, data of the shadow support package portion can be modified with user-specific customizations.

Although not shown in FIGS. 4A and 4B, in some embodiments, the original program database 420 may not include customizations based on support packages. Accordingly, such customizations, and modifications of databases based on customizations, may not be included as part of an upgrade process.

Figure 4C:
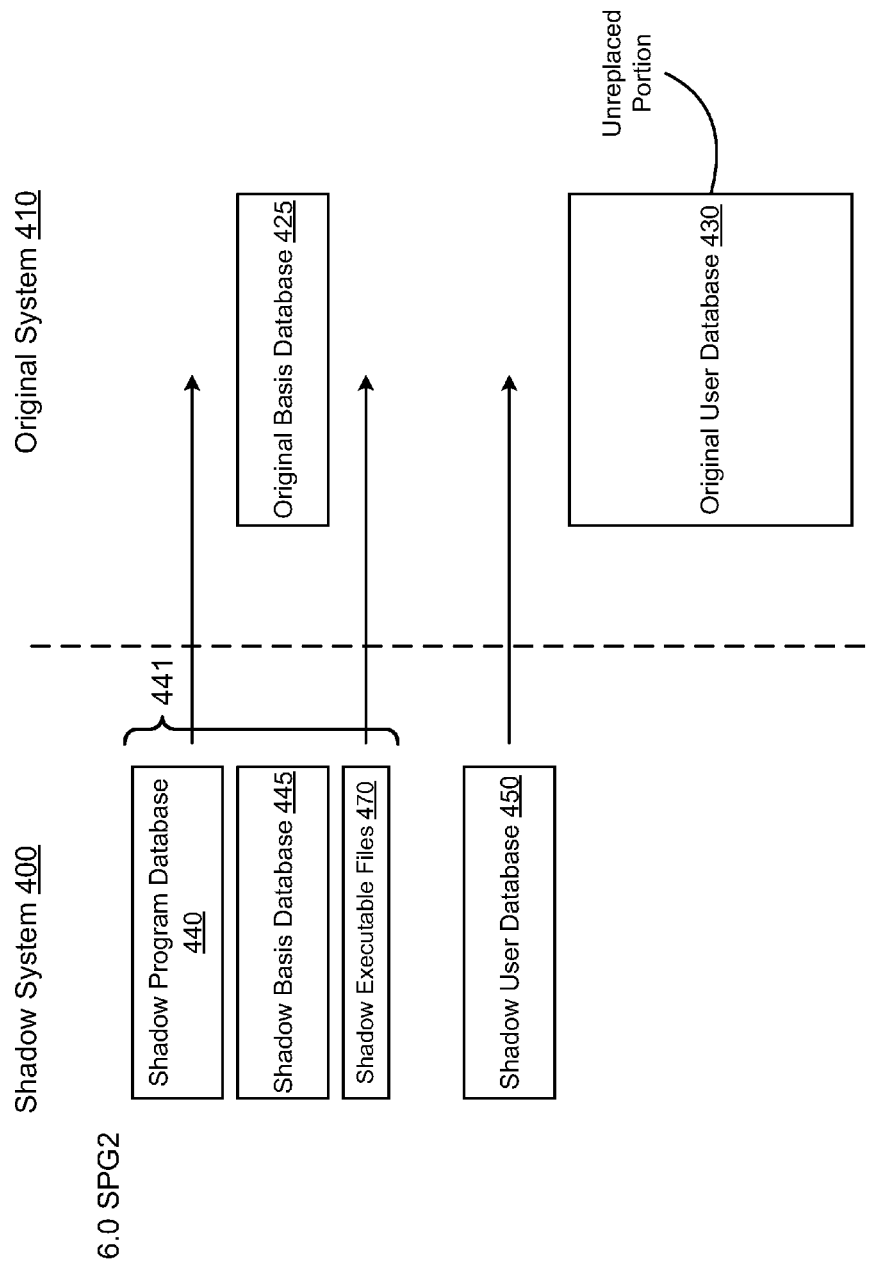
FIG. 4C is a diagram that illustrates replacement of the original system with the shadow system shown in FIG. 4B.

FIG. 4C is a diagram that illustrates replacement of the original system 410 with the shadow system 400 shown in FIG. 4B. In some embodiments, the replacement of the original system 410 with the shadow system 400 can be performed during a portion of the upgrade process referred to as a replacement stage. During the replacement stage, the original system 410 can be in the downstate and the shadow system 400 can be in a dismantled state (e.g., can be removed as a functional system). The original system 410 can be in a downstate (and downtime) so that portions of the original system 410 can be replaced with portions of the shadow system 400.

As shown in FIG. 4C, the original program 421, which includes the original program database 420, and the original executable files 480 (shown in FIG. 4B), are replaced with the shadow program 441, which includes the shadow program database 440, and shadow executable files 470. As indicated previously, the shadow program 441 can be in an upgraded program state.

As shown in FIG. 4C, only some portions of the original user database 430 are replaced by the shadow user database 450. Specifically only portions of the original user database 430 that were originally identified for mirroring in the shadow system 400 are replaced by the shadow used database 450. Portions of the original user database 430 that are not replaced by the shadow user database 450 (referred to as the unreplaced portion) can be upgraded during downtime (and/or a downstate) of the original system 410.

As shown in FIG. 4C, the original basis database 425 is not replaced by the shadow basis database 445. In some embodiments, the shadow basis database 445 replaces the original basis database 425.

Figure 4D:
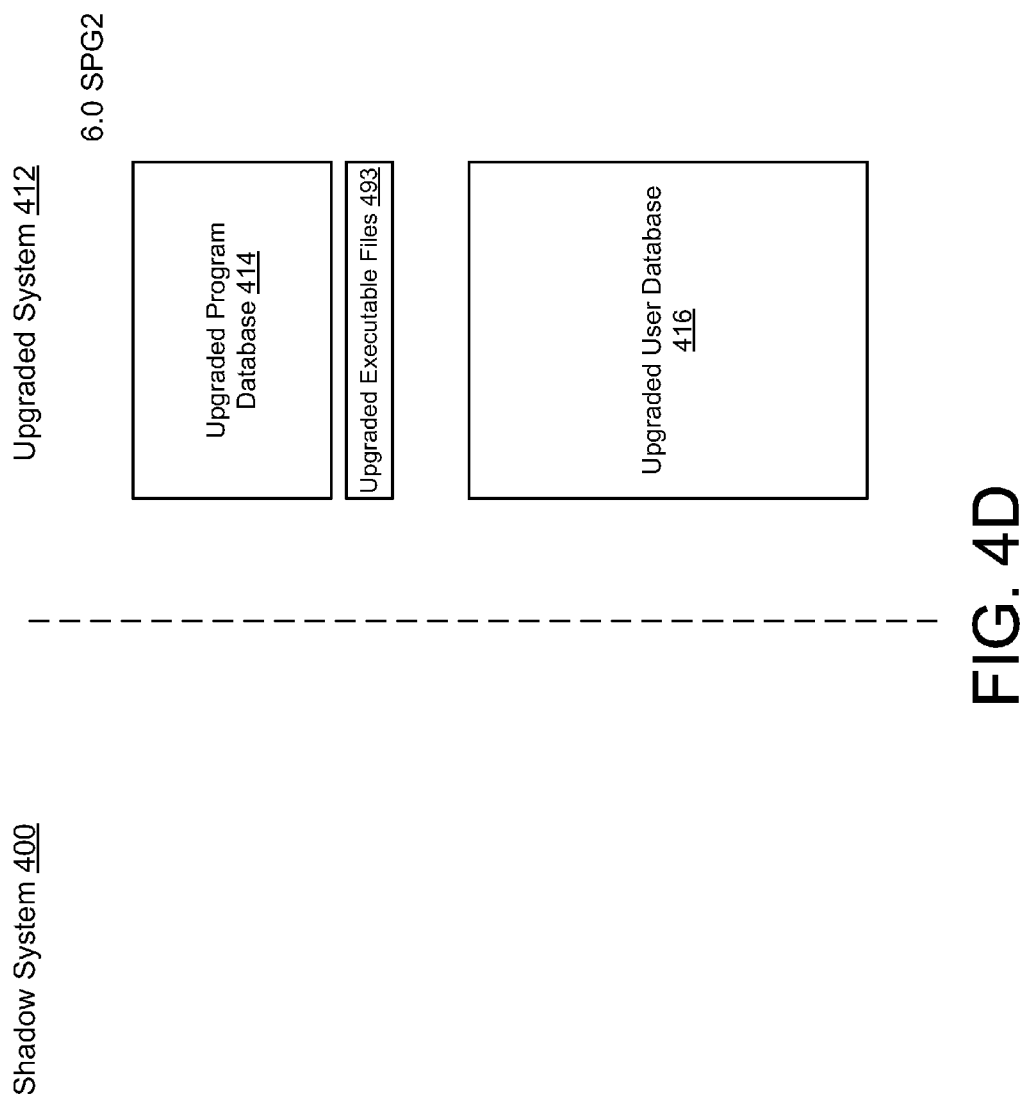
FIG. 4D is a diagram that illustrates an upgraded system after the replacement stage of an upgrade process has been completed.

FIG. 4D is a diagram that illustrates an upgraded system 412 after the replacement stage of an upgrade process has been completed. In some embodiments, the portions of the original system 410 that are not replaced by the shadow system 400 (e.g., the original basis database 425 and/or the unreplaced portions of the original user database 430) can be upgraded during a downtime (and/or a downstate) of the original system 410. The upgraded system 412 shown in FIG. 4D is a snapshot of the system after the unreplaced portions of the original system 410 are upgraded. The upgraded system 412 can be a replaced version of the original system 410 shown in FIG. 4C. The upgraded system 412 can be based, at least in part, on the upgraded program version previously manipulated within the shadow system 400.

The upgraded system 412 includes an upgraded program database 414, an upgraded user database 416, and upgraded executable files 493. In some embodiments, the upgraded program database 414 can also include an upgraded basis database. The upgraded program database 414 includes an upgraded structure and upgraded data stored within the upgraded structure. In some embodiments, the upgraded program database 414 can include a program portion and a support package portion. The upgraded user database 416 includes an upgraded structure and upgraded data stored within the upgraded structure.

After the original system 410 has been replaced by the shadow system 402 to define the upgraded system 412, the upgraded system 412 can be changed from a downstate to an upstate. In other words, the upgraded system 412 can be started or restarted (based on program version 6.0 SPG2). At this point in time, the structure adjustment and data import stages shown and described in connection with FIGS. 3A and 3B can be executed.

As shown in FIG. 4D, the components of the shadow system 400 have been completely deleted. In some embodiments, certain AIMs and/or XPRAs that were not enabled (and/or designated) for execution within the shadow system 400 can be executed within the upgraded system 412. In some embodiments, the AIMs can be executed within the upgraded system 412 while the upgraded system 412 is in an upstate (but during downtime). In some embodiments, the AIMs and/or XPRAs can be executed during an AIM execution stage of the upgrade process.

In some embodiments, after the AIM execution stage of the upgrade process has been completed a post-upgrade activities stage of the upgrade process can be initiated. During the post-upgrade activity stage, the upgrade system 412 can be unlocked for use by one or more users. In other words, the upgrade system 412 can be triggered to operate in an operational (or active) mode. In some embodiments, during the post-upgrade activity stage, batch jobs previously suspended can be restarted by, for example, an administrator. In some embodiments, after the AIM execution stage of the upgrade process has been completed, a system upgrade module (such as system upgrade module 170 shown in FIG. 1) can be configured to notify, for example, an administrator that post-upgrade activities may be initiated.

In some embodiments, one or more users may be notified using a system upgrade module, such as system upgrade module 170 shown in FIG. 1, that the upgraded system 412 is ready for use in an operational (or active) mode. In some embodiments, one or more users may not be notified until the post-upgrade activity stage has been completed.

Although not shown in FIGS. 4A through 4D, in some embodiments the techniques described herein can be used to upgrade one or more databases without upgrading one or more executable files. For example, the techniques described herein can be used to upgrade an original user database without upgrading an original program database and/or original executable files associated with the original program database. In such embodiments, the portions of the upgrade process associated with upgrading the original program database and/or the original executable files may be omitted. Similarly, the techniques described herein can be used to upgrade the original program database without upgrading a portion of an original user database. In such embodiments, the portions of the upgrade process associated with upgrading the original user database and/or the original executable files may be omitted.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
    a processor configured to:
        define, at a shadow system, a shadow program database including data and a structure collectively defining an upgrade to an original program database on an original system;
        define, at the shadow system, a shadow basis database including information related to start-up functions of the shadow system,
            the start-up functions including transitioning the shadow system from a downstate to an upstate,
            the information related to start-up functions including data related to at least one service configured to enable basic functionality of the shadow system,
            the shadow basis database is defined in shadow system during an upstate of the shadow system and an upstate of the original system,
            the shadow basis database is defined based on an original basis database associated with the original system, and
            the shadow basis database is upgraded from the original basis database to the shadow basis database based on differences between the original system and a target system during a downstate of the shadow system and the upstate of the original system; and
        trigger the shadow system to change from a downstate to an upstate based on a combination of data included in the shadow basis database and the data of the shadow program database.

2. The computer system of claim 1, wherein the shadow basis database is accessed by a kernel of the shadow system when the shadow system is changed from the downstate to the upstate.

3. The computer system of claim 1, wherein the processor is configured to change the shadow system from the downstate to the upstate at a first time, to change the shadow system from the upstate to the downstate at a second time before the first time,
    and to modify the shadow database based on a customization associated with a support package between the first time and the second time.

4. The computer system of claim 1, wherein the processor is further configured to:
    modify the shadow database based on a customization associated with a support package before the processor triggers the shadow system to change from the downstate to the upstate.

5. The computer system of claim 1, wherein a first after import method is triggered for execution at the shadow system while the shadow system is in the upstate, and a second after import method is triggered for execution after the shadow system has been dismantled.

6. The computer system of claim 1, wherein an enhancement spot method is triggered for execution at the shadow system while the shadow system is in the upstate, and a second enhancement spot method is triggered for execution after the original system has been replaced by the shadow system.

7. The computer system of claim 1, wherein a shadow user database is defined during an uptime of the original system, and wherein the processor is further configured to:
    replace a portion of an original user database with the shadow user database after the shadow system has been changed from the downstate to the upstate, and configured to replace the original program database with the shadow program database during a downtime of the original system.

8. The computer system of claim 1, wherein the processor is further configured to:
    suspend a batch job of the original system and configured to log-off a user from the original system before a downtime of the original system is initiated.

9. The computer system of claim 1, wherein the shadow system is configured to operate within hardware of the original system, and wherein the processor is further configured to:
    replace an original user database with a shadow user database, and configured to replace the original program database with the shadow program database during a downtime of the original system, and
    dismantle the shadow system from the hardware of the original system before the original user database and the original program database have been replaced.

10. The computer system of claim 1, wherein a combination of a default shadow program database and a support package program database correspond with the data and the structure of the shadow program database.

11. The computer system of claim 1, wherein the shadow system includes a set of upgrade executable files associated with the structure of the shadow program database and the data of the shadow program database, the original system includes a set of original executable files, and wherein the processor is further configured to:
    replace a structure of the original program database on the original system with the structure of the shadow program database on the shadow system, and configured to replace data of the original program database on the original system with the data of the shadow program database on the shadow system; and
    replace the set of original executable files included in the original system with the set of upgrade executable files included in the shadow system during a downtime of the original system.

12. The computer system of claim 1, wherein the structure of the shadow program database is defined by a plurality of tables and the data of the shadow program database includes a plurality of program instructions stored within the plurality of tables, the shadow system includes a set of upgrade executable files configured to access the plurality of program instructions from the plurality of tables.

13. A non-transitory computer-readable storage medium storing code representing instructions that when executed are configured to cause a processor to perform a process, the code comprising code to:
    define, at a shadow system, a shadow program database including data and a structure collectively defining an upgrade to an original program database on an original system;
    define, at the shadow system, a shadow basis database including information related to start-up functions of the shadow system, the information related to start-up functions including data related to at least one service configured to enable basic functionality of the shadow system, the start-up functions including transitioning the shadow system from a downstate to an upstate, the shadow basis database is defined in the shadow system during an upstate of the shadow system and an upstate of the original system, the shadow basis database is defined based on an original basis database associated with the original system, and the shadow basis database is upgraded from the original basis database to the shadow basis database based on differences between the original system and a target system during a downstate of the shadow system and the upstate of the original system;

and trigger the shadow system to change from a downstate to an upstate based on a combination of data included in the shadow basis database and the data of the shadow program database.

14. The non-transitory computer-readable storage medium of claim 13, wherein the shadow basis database is accessed by a kernel of the shadow system when the shadow system is changed from the downstate to the upstate.

15. The non-transitory computer-readable storage medium of claim 13, wherein the code further comprises code to change the shadow system from the downstate to the upstate at a first time, to change the shadow system from the upstate to the downstate at a second time before the first time, and to modify the shadow database based on a customization associated with a support package between the first time and the second time.

16. The non-transitory computer-readable storage medium of claim 13, further comprising code to:

modify the shadow database based on a customization associated with a support package before the code triggers the shadow system to change from the downstate to the upstate.

17. The non-transitory computer-readable storage medium of claim 13, wherein a first after import method is triggered for execution at the shadow system while the shadow system is in the upstate, and a second after import method is triggered for execution after the shadow system has been dismantled.

18. A method including executing instructions recorded on a non-transitory computer-readable storage media using at least one processor, the method comprising:

defining, at a shadow system, a shadow program database including data and a structure collectively defining an upgrade to an original program database on an original system;

defining, at the shadow system, a shadow basis database including information related to start-up functions of the shadow system, the information related to start-up functions including data related to at least one service configured to enable basic functionality of the shadow system, the start-up functions including transitioning the shadow system from a downstate to an upstate, the shadow basis database is defined in the shadow system during an upstate of the shadow system and an upstate of the original system, the shadow basis database is defined based on an original basis database associated with the original system, and the shadow basis database is upgraded from the original basis database to the shadow basis database based on differences between the original system and a target system during a downstate of the shadow system and the upstate of the original system;

and triggering the shadow system to change from a downstate to an upstate based on a combination of data included in the shadow basis database and the data of the shadow program database.

19. The method of claim 18, wherein the shadow basis database is accessed by a kernel of the shadow system when the shadow system is changed from the downstate to the upstate.

20. The method of claim 18, wherein the at least one processor is configured to change the shadow system from the downstate to the upstate at a first time, and to change the shadow system from the upstate to the downstate at a second time before the first time, the method further comprising:

modifying the shadow database based on a customization associated with a support package between the first time and the second time.

* * * * *